Patented Mar. 24, 1936

2,035,098

UNITED STATES PATENT OFFICE 2,035,098

SULPHUR RESINS AND METHODS OF PREPARATION

William Seaman, Glens Falls, N. Y., assignor to Standard Oil Development Company No Drawing. Application November 16, 1931, Serial No. 575,466

10 Claims. (Cl. 260—2)

This invention relates to new resins containing sulphur and to methods of preparation thereof and more particularly to the use of organic sulphur compounds such as those obtainable from petroleum and their derivatives in the preparation of resins.

It is known that resins may be prepared by the condensation of resiniphore substances with oxygen-containing organic compounds, particularly hydroxy compounds such as phenol, cresol, resorcinol and the like by application of heat, pressure, catalysts such as strong acids or bases or resinifying agents such as the sulphur chlorides. Olefines, aldehydes and ketones may also be added with the above hydroxy compounds and resins of widely varying properties may be thereby obtained. Turpentine or pine oil and rosin may also be converted into improved or modified resins with sulphuric acid and/or phenol, formaldehyde and other known conditions favoring resin formation.

It has now been found that organic compounds containing sulphur such as mercaptans, thioethers, disulphides, polysulphides, sulphoxides, sulphones, sulphinic or sulphonic acids, and in general the sulphur-containing compounds or derivatives thereof occurring in or obtained from petroleum, may be used in combinations of the above resin forming processes and new types of resins may be thereby obtained. All such compounds contain the radical RS— corresponding to the petroleum mercaptans from which they are derived. R indicates the hydrocarbon radical of the petroleum mercaptans. Mixtures of such organic compounds containing sulphur suitable for this invention may be prepared from the mixtures of mercaptans extracted from petroleum and accordingly contain RS— groups corresponding to such mixtures of mercaptans. For example, these organic sulphur compounds may be used in preparing resins with aromatic hydroxy compounds and sulphur chloride or dichloride with or without other condensing agents such as the aldehydes, ketones and olefinic hydrocarbons or other compounds.

The following example is illustrative of this type of reaction. A mixture of cercaptans is obtained by steam distillation of an aqueous caustic soda solution used for treating light cracked petroleum naphthas. One part of this mixture after distilling off components boiling below 40° C. is mixed with an equal part of phenol and the resulting mixture is treated with an excess of sulphur monochloride and warmed sufficiently to start reaction. By this process a resin is obtained whose hardness depends upon the degree of heating, relatively soft resins being obtained on heating at temperatures below 80 to 100° C., resins of increasing hardness being formed at higher temperatures and substantially infusible and insoluble resins being obtained on prolonged heating at temperatures of 150 to 180° C. or above. In place of sulphur monochloride in the above reaction the dichloride may be used or free flowers of sulphur may even be used in addition or in substitution for the chloride. Other compounds such as the naphthols, cresols, chlorphenols and the like, resorcinol, pine oil or resin and similar substances may be used in addition or in substitution for the phenol. Phenol and formaldehyde may be reacted in the presence of organic sulphur compounds derived from petroleum. In general, resins of the soluble-and-fusible types, including cracking coil tar resins as prepared in co-pending applications 572,058–59–60 and 572,228, may also be treated with these organic sulphur compounds. The other organic sulphur compounds already mentioned may be used in addition to or in substitution for the mercaptans. For example, the polysulphides such as methyl, ethyl and propyl tri, tetra or penta sulphides or similar alkyl, aryl or mixed polysulphides, are particularly desirable for preparing phenol-sulphur resins. In the preparation of these resins the organic sulphides may act simply as mutual solvents for the reagents and resins formed, or they may act as a source of sulphur or may enter more or less completely as reagents into the finished resins.

The solubility of the resins will naturally vary widely depending upon the other reagents used with the organic sulphides and upon the degree of heat or pressure and the type of catalyst used in preparing the resin. In general the solubility and other characteristics are similar to those of resins prepared by known corresponding methods with the addition of other organic compounds, one of the chief advantages of using the organic sulphur compounds being their cheapness and ready availability from petroleum oils. For example, the thio-ethers may be prepared by passing the mercaptans already described over suitable metallic sulphide catalysts as described in the co-pending application No. 585,156 filed January 6, 1932 by Seaman and Huffman. The disulphides may be prepared by limited oxidation of the spent aqueous caustic solution used for treating petroleum naphthas as described in the co-pending application Ser. No. 537,175 filed May 13, 1931 by H. G. M. Fischer now Patent 2,001,715.

The sulphoxides and sulphones may be prepared by oxidation of the thio-ethers, and the polysulphides may be prepared from either the thioethers or disulphides by reaction with metallic polysulphides or by other known methods. These organic sulphur compounds are usually obtained as complex mixtures from petroleum and may be used as obtained or after separation by suitable means into pure compounds. This invention includes generally both aryl, alkyl and mixed sulphur compounds of the types already described which are defined for the purpose of this invention as organic sulphur compounds derivable from the sulphur compounds of petroleum.

The resins prepared according to my invention are suitable for use in substitution for other known resins of similar characteristics such as solubility, fusibility, and hardness. These resins may be used in coating compositions such as spirit varnishes, oil varnishes, paints and the like, and in the preparation of moulded articles generally. The resins may be mixed with plasticizing substances and fillers such as camphor, glycerol, rubber, nitro-cellulose, asbestos, mica, silica, wood flour and the like. The resins prepared at higher temperatures and being substantially infusible and insoluble are similar to the resinoids such as bakelite C and have similar uses.

My invention is not to be limited to any examples given illustratively nor to any theory of the reaction of these sulphur compounds in forming resins, but only by the following claims in which I wish to claim all novelty insofar as the prior art permits.

I claim:

1. Method of preparing a resin containing sulphur, comprising heating a mixture of an aromatic hydroxy compound having a hydroxy group attached to the nucleus, with a substance capable of reaction therewith to form resins and selected from the group consisting of aldehydes, ketones, olefinic hydrocarbons, sulphur chloride and sulphur, and with a mixture of organic sulphur compounds containing RS— groups, corresponding to the mixture of mercaptans present in petroleum, in which R indicates a hydrocarbon radical of such mercaptans.

2. The product of the process of claim 1.

3. In the preparation of synthetic resins containing sulphur by reaction of aromatic hydroxy compounds having a hydroxy group attached to the nucleus, with a chloride of sulphur, the improvement comprising substituting for a part of said hydroxy compound a mixture of organic sulphur compounds containing RS— groups corresponding to the mixture of mercaptans present in petroleum, in which R indicates a hydrocarbon radical of such mercaptans.

4. A sulphur containing resin prepared by reaction of a phenol, a chloride of sulphur, and an organic sulphur compound containing RS— groups corresponding to the mixture of mercaptans present in petroleum, in which R indicates a hydrocarbon radical of such mercaptans.

5. Method of preparing a resin containing sulphur comprising heating a mixture of phenol and sulphur monochloride with a mixture of mercaptans corresponding to the mixture of mercaptans in a petroleum oil.

6. Method according to claim 5, in which the reaction is carried out by heating at temperatures below 100° C.

7. Method according to claim 5, in which the reaction is carried out by heating at temperatures of 150 to 180° C.

8. Method of preparing a resin containing sulphur which comprises heating a mixture of about one part of mercaptans obtained from light cracked petroleum naphthas and freed from components boiling below 40° C., about one part of phenol and an excess of sulphur monochloride.

9. A sulphur containing resin prepared by reaction of a composition comprising phenol, sulphur monochloride, and a mixture of mercaptans extracted from a petroleum oil.

10. Method of preparing a resin containing sulphur comprising heating a mixture of phenol and formaldehyde with a mixture of organic sulphur compounds containing RS— groups corresponding to the mixture of mercaptans present in petroleum, in which R indicates a hydrocarbon radical of such mercaptans.

WILLIAM SEAMAN.